United States Patent [19]

Brandt

[11] Patent Number: 5,438,446
[45] Date of Patent: Aug. 1, 1995

[54] UNIFORM REFLECTANCE OPTICAL MIRROR

[75] Inventor: Michael B. Brandt, Walworth, N.Y.

[73] Assignee: Eastman Kodak Company, Rochester, N.Y.

[21] Appl. No.: 21,739

[22] Filed: Feb. 23, 1993

Related U.S. Application Data

[63] Continuation of Ser. No. 819,033, Jan. 10, 1992, abandoned.

[51] Int. Cl.$^6$ ............................................. G02B 26/08
[52] U.S. Cl. ................................... 359/196; 359/218; 359/488; 359/584
[58] Field of Search ................ 359/212, 216, 217, 218, 359/219, 488, 584, 360, 196; 428/433, 632

[56] References Cited

U.S. PATENT DOCUMENTS

| | | | |
|---|---|---|---|
| 2,590,906 | 4/1952 | Tripp | 88/110 |
| 3,410,710 | 11/1968 | Mochel | 117/33.3 |
| 4,142,006 | 2/1979 | Chyoke et al. | 427/162 |
| 4,205,100 | 5/1980 | Fisli | 427/162 |
| 4,214,818 | 7/1980 | Chyoke et al. | 359/845 |
| 4,272,588 | 6/1981 | Yoldas et al. | 428/433 |
| 4,322,130 | 3/1982 | Ito et al. | 359/584 |
| 4,448,855 | 5/1984 | Sneaha et al. | 428/632 |
| 4,545,646 | 10/1985 | Chern et al. | 359/569 |
| 4,592,622 | 6/1986 | Hashimoto et al. | 359/218 |
| 4,643,518 | 2/1987 | Taniguchi | 359/218 |
| 4,662,722 | 5/1987 | Buczek et al. | 359/488 |
| 4,753,504 | 6/1988 | Kyogoku | 359/217 |
| 4,796,962 | 1/1989 | DeJager et al. | 359/217 |
| 4,826,271 | 5/1989 | Takahashi et al. | 359/218 |
| 4,921,320 | 5/1990 | DeJager et al. | 359/205 |
| 4,930,869 | 6/1990 | Miyagawa et al. | 359/205 |
| 4,968,117 | 11/1990 | Chern et al. | 359/573 |
| 5,126,873 | 6/1992 | Ang | 359/217 |

FOREIGN PATENT DOCUMENTS

| | | |
|---|---|---|
| 0093921 | 11/1983 | European Pat. Off. . |
| 0120240 | 10/1984 | European Pat. Off. . |
| 0468502 | 1/1992 | European Pat. Off. . |

OTHER PUBLICATIONS

Patent Abstracts of Japan, vol. 9, No. 24 (P-331) 31 Jan. 85 & JP-A-59168411 (Hitachi) 22 Sep. 84.

Primary Examiner—Loha Ben
Assistant Examiner—James Phan
Attorney, Agent, or Firm—William F. Noval

[57] ABSTRACT

A uniform reflectance mirror deflector of an optical scanner for scanning a light beam onto an image object or a receiving medium. The scanner includes a rotatable polygon-shaped mirror having a plurality of planes reflective mirror facets for deflecting and thereby scanning the beam through a predetermined angle while rotating and thereby varying the angle of incidence of the light beam on the deflector. In order to achieve relative uniformity of reflectance and avoid intensity variations in the reflected beam, a protective optical coating layer is selected to have a thickness which minimizes variation in reflectance over the range of angular displacement of the mirror in relation to the light source during its rotation. The thickness of the protective coating layer uniformly applied over the entire surface of each facet of the polygon-shaped mirror is determined by calculating the reflectance of P-polarized and S-polarized incident radiation components at a predetermined wave length of incident radiation over a range of protective coating film thicknesses of between 0 and one wave length and over the range of angles of incidence. Coating thicknesses in this range are selected in accordance with the resulting demonstrated relative uniformity of reflectance.

2 Claims, 5 Drawing Sheets

UNIFORM REFLECTANCE OPTICAL MIRROR

This application is a continuation of application Ser. No. 07/819,033, filed Jan. 10, 1992 now abandoned.

TECHNICAL FIELD OF THE INVENTION

The present invention relates to a light beam scanning system employing a mirror that is vibrated or rotated to scan incident light beam radiation through an optical system onto an object to be scanned or onto a receiving medium wherein reflectance variations introduced by the angular displacement of the moving mirror in relation to the fixed light beam source are minimized.

BACKGROUND OF THE INVENTION

Optical image scanners for scanning an image to be stored or reproduced are well-known in the prior art. Such optical scanners are typically used in laser printers for scanning a laser generated light beam across a receiving or recording medium with image information effected by modulating the laser source of the light beam with an image signal and scanning the recording medium with the modulated light beam to form a visible image thereon, either directly or through subsequent processing of the medium. Similar scanners are used in optical character recognition and the like to read an object, image or text for storage or reproduction.

In the known image scanning reading/writing systems, the light beam from the laser source is deflected by a rotating mirror, typically a high speed rotatable polygon having a number of facets, which deflects the incident light beam in a flat tangential field across the scanned image or the receiving medium. Optical lens systems are typically employed in the optical path of the incident light beam to shape it so as to achieve the desired beam profile at the image or receiving medium. Often an additional lens system is employed, in the optical path of the reflected beam, to correct any beam position errors in the cross-scan direction resulting from angular misalignment of the facets of the polygon shaped mirror and to provide a relatively straight, distortion free line scan. Typically in such optical scanners, the laser light beam source and its associated beam shaping lens system are fixed to direct the light beam in an optical path intersecting the "waist" of the rotating mirror facets. Therefore as the mirror rotates, the angle of incidence of the source light beam to the mirror surface changes, resulting in the angular deflection or scanning of the reflected light beam in the desired flat tangential field.

Typical optical scanners are disclosed in commonly assigned U.S. Pat. Nos. 4,796,962 and 4,921,320, incorporated herein by reference in their entireties, and the scanners described in the prior art patents referenced therein. The optical scanners disclosed in the '962 and '320 patents are employed for recording images on receiving mediums which may constitute intermediate image retaining mediums, e.g., xerographic drums, or hard copy prints of pictorial or alphanumeric information.

The '320 and '962 patents are directed to improvements in the optical system for minimizing spot size variations and achieving relatively straight line scans and flat tangential fields for creating half-tone images of good quality.

The polygon-shaped, rotating mirror employed in the prior art optical scanners is typically manufactured of a highly polished metal, e.g., aluminum, or a metallic coating of silver or aluminum on glass which are either left uncoated or else are overcoated with a protective dielectric coating of a metal oxide or fluoride deposited on the surface to protect the mirror surface from damage and oxidation. The thickness of this coating, if specified at all in relation to reflectance, is typically chosen to provide enhanced reflectance at some particular wave length of incident light radiation and angle of incidence. The reflectance of the mirror, be it a metallic mirror or a metallic coating on glass, is a function of the angle of incidence of the light beam. In a typical optical scanner/printer, this angle of incidence may vary over a large range depending upon the focal length of the optical system and the format size of the scanned image or receiving medium, and the resulting reflectance may likewise vary by several percent over the optical scan. The resulting reflectance variation with scan angle introduces a non-uniformity in printed or scanned images, as the intensity of the reflected light beam varies. If the image uniformity is not acceptable, correction may require incorporation of elaborate calibration and compensation technologies.

This problem with reflectance variation as a function of scan angle is noted in U.S. Pat. No. 4,930,869 which provides a light-transmissive plate angularly oriented across the incident and reflective light beam optical paths having an anti-reflection coating thereon. Employing S-polarized or P-polarized incident radiation, the transmittance of the glass plate and the angle of inclination of the glass plate are selected to compensate for the change in reflectance of the mirror facets as the incident angle changes during rotation. Such an arrangement partially compensates for the deflector mirror's reflectance variations with angle of incidence but requires additional structure enclosing the polygon shaped reflecting mirror. The reflecting coating reflects a portion of the incident light beam as stray light that must be baffled from the optical path of the scanned light beam.

In a further embodiment described in the '869 patent, the glass plate is replaced by a further reflecting mirror which itself reflects the scanning light beam reflected by the rotating mirror facets. These embodiments of the '869 patent themselves introduce both complexity and potential aberrations in the desirable flat tangential field, straight line scan and distortion described above. Moreover, they increase stray light reflectance, ghost images, and intensity losses at the interfaces created by the glass plate or the additional mirror.

The polygon-shaped mirrors presently being utilized in many printer-scanner systems consist of an aluminum substrate, carefully machined and highly polished to present optically flat facets, with a dielectric coating deposited on the facets to protect the mirror surface from oxidation. Often, the aluminum substrate is coated with a one-half wave "optical" thickness of $SiO_2$. The purpose of this silicone dioxide coating is to prevent degradation of the mirror's reflectivity by oxidation, to enhance the reflectivity of the mirror, and to provide a hard coating which protects the surface finish from degradation due to the environment and cleaning operations. The thickness of the dielectric coating, if specified at all, is generally chosen to be equal to $L_0/2N$, where $L_0$ is the wave length of the incident radiation and free space and N is the index of refraction of the homogeneous protective coating layer, as taught, for example, in U.S. Pat. No. 4,662,722.

This recommended coating thickness is known to obtain the highest average reflectance at normal incidence and is referred to as the HWOT (½ wave length optical thickness). This particular thickness also happens to provide minimum relative phase shift between the reflected S- and P-polarization components. The '722 patent is directed to specifying such a thickness for minimizing the relative phase shift between the reflected S- and P-polarization components. Such a thickness specification thus provides high reflectance at the normal angle of incidence but does not address the fall off in reflectance as the angle of incidence varies between the minimum and maximum angles encountered in the angular displacement of the rotating mirror facet during a single scan of the incident light beam.

A further U.S. Pat. No. 4,322,130 sets forth a number of coated mirror embodiments of various metal substrates and metal oxide and fluoride coatings where the dielectric coatings are specified as having thicknesses optimized to achieve a desired phase difference between the reflected S- and P- polarization components of an incident polarized light beam. The coated mirrors are employed to reflect light incident at 45° to normal and the angle of incidence does not change.

SUMMARY OF THE INVENTION

It is therefore an object of the present invention to minimize the variation in reflectance of a movable optical mirror through the full range of angular presentation of the mirror to the incident light beam in scanning the reflected light beam in an optical scanning system without employing additional structure or introducing additional optical elements in the scanned beam.

Another object of the present invention is to provide a light beam scanning device for scanning an object to read image information therefrom or record image information on a receiver medium comprising a reflecting light deflector for deflecting a light beam in a plane, an optical lens system for passing the light beam deflected by the light deflector toward the object or receiver medium, wherein the reflecting light deflector comprises a movable reflecting mirror for deflecting an incident light beam emitted by a fixed light source and wherein the reflecting mirror has a coating of a thickness chosen to minimize the variation in reflectance throughout the range of movement of the movable mirror.

These and other objects of the present invention are realized in a coating for a reflective mirror for reflecting P-polarized or S-polarized incident light beams of a predetermined wave length having a thickness that minimizes the difference in reflectance over the full range of incidence angles limited by the beginning and ending of each scan.

In accordance with the present invention, it has been discovered that the selection of the optimal thickness of the protective coating for achieving the highest reflectance over the range of incident angles utilized in the application may maximize the difference between the reflectance at the two extremes of angular incidence of a movable mirror in effecting the scanning of the incident light beam. In accordance with the present invention it has been found that there are other thicknesses of the coating which, while providing less than optimal reflectance at any angle of incidence within the range of incident light beam angles, provides for relatively uniform reflectance through the entire range of scanning angles.

BRIEF DESCRIPTION OF THE DRAWINGS

The above and other objects, features and advantages of the present invention will become more apparent from the following description when taken in conjunction with the accompanying drawings in which preferred embodiments of the present invention are shown by way of illustrative example and in which.

DETAILED DESCRIPTION OF THE PREFERRED EMBODIMENTS

Figure 1:
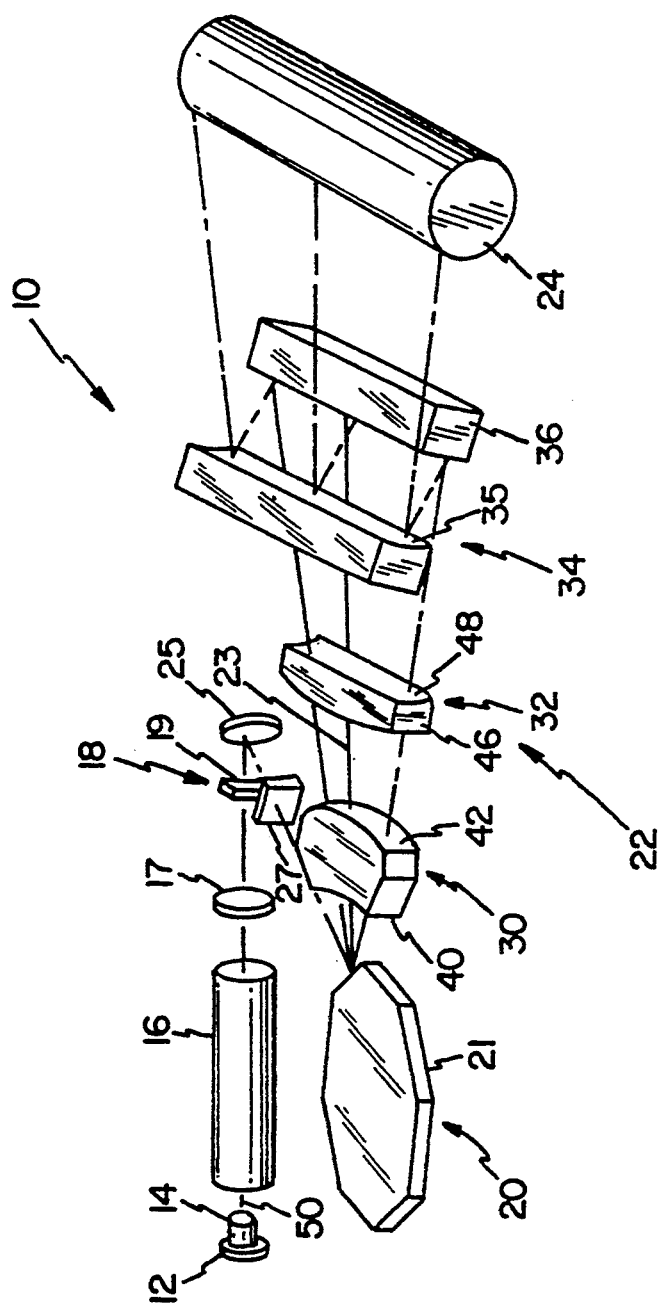
FIG. 1 depicts a perspective view of a prior art optical scanner.

With reference to FIG. 1 it depicts an optical scanner 10 as shown and described in the above incorporated '320 patent. Scanner 10 comprises a diode laser 12 which serves as a light source, a collimator lens 14, a beam expander 16, a beam shaper system 18, a rotating polygon-shaped mirror 20, and an optical system 22 between the polygon-shaped mirror 20 and a receiving medium 24. Beam shaper system 18 includes a spherical lens 17, a positive cylinder lens 19, a negative cylinder lens 27, and a planar mirror 25 between lenses 19 and 27. The optical system 22 is disposed along an optical axis 23 and comprises two refracting scan lens elements 30 and 32 and a cylindrical mirror 34. Optical system 22 also includes a planar mirror 36 which is used between lens element 32 and mirror 34 to fold the light beam.

The lens element 30 is a thick meniscus lens element having two spherical surfaces 40 and 42. Surface 40 has a negative power and surface 42 has a positive power. The optical power of element 30 is very slightly positive. Lens element 32 has two cylindrical surfaces 46 and 48 which have their respective cylinder axes (not shown) oriented perpendicular to each other; both of the axes are also set perpendicular to the optical axis 23 which is defined by the first lens element 30. Surface 46 of lens element 32 has positive cylindrical power in the scan direction. Surface 48 of element 32 has negative cylindrical power in the cross-scan direction. Thus, the power of element 32 is positive in the scan direction and is negative in the cross-scan direction. The cylinder mirror 34 has a positive cylindrical power in the cross-scan direction, and the axis of the cylinder mirror is perpendicular to the optical axis 23.

Diode laser 12 is selected to produce a laser beam 50 of a predetermined wave length which is anamorphically shaped by the beam shaper system 18 before the beam is directed onto the facets 21 of polygon-shaped mirror 20. In the cross-scan direction, beam 50 comes to a waist focus in the near vicinity of a polygon facet 21. In the scan direction, beam 50 is converging towards a waist focus located at a predetermined distance, e.g., about 720 mm beyond the polygon-shaped mirror 20. Thus, in the scan direction, the incident beam at the mirror facet 21 is not collimated but has a positive vergence. Beam 50, after reflection at the facet 21 and after having passed through the two lens elements 30 and 32, is reflected again at the cylinder mirror 34 and comes to a waist focus at, or in the near vicinity of, the receiving medium 24. In the scan direction, the waist focus stays within ±0.13 mm from the receiving medium over a total line length exceeding 13 inches. As a result, the computed beam radius which is nominally about 0.012 mm to the exp (−2) power points, varies less than 5% in size in the scan direction. In the cross-scan direction, the waist focus stays within ±0.35 mm from the receiving medium 24, and the beam radius, nominally about 0.015 mm, varies by less than 10% in this cross-scan direction. These properties of the laser beam 50 at the receiving medium 24 make it suitable to perform exceptionally high-resolution scanning.

The resolution obtained with optical scanner 10 is such that it can be used in creating exceptional quality continuous tone or half-tone images, the latter as would be formed, for example, by using a screen (not shown) having 150 dots per inch. The size of these equally spaced dots determines the apparent gray level of the image in any small region. Each dot could consist of a square 12 by 12 array of minipixels; in effect we would have eighteen hundred minipixels per inch, in both scan and cross-scan directions. By controlling the power level of the laser beam 50 as it writes each line, these minipixels are switched on and off, thereby altering the apparent size of each dot. The laser beam spot sizes, provided by the present invention are consistent with its use for this purpose.

The remaining features of the system depicted in FIG. 1 are described in the '320 patent in detail. For purposes of the present invention, emphasis is placed on the coating of the facets 21 of the polygon shaped rotating mirror 20 in conjunction with the description of FIGS. 2-6. The coating of the present invention is preferably incorporated into an optical scanner used as a printer, although it can be employed in the less critical environment of scanning an optical image as also described in the '320 patent.

Figure 4:
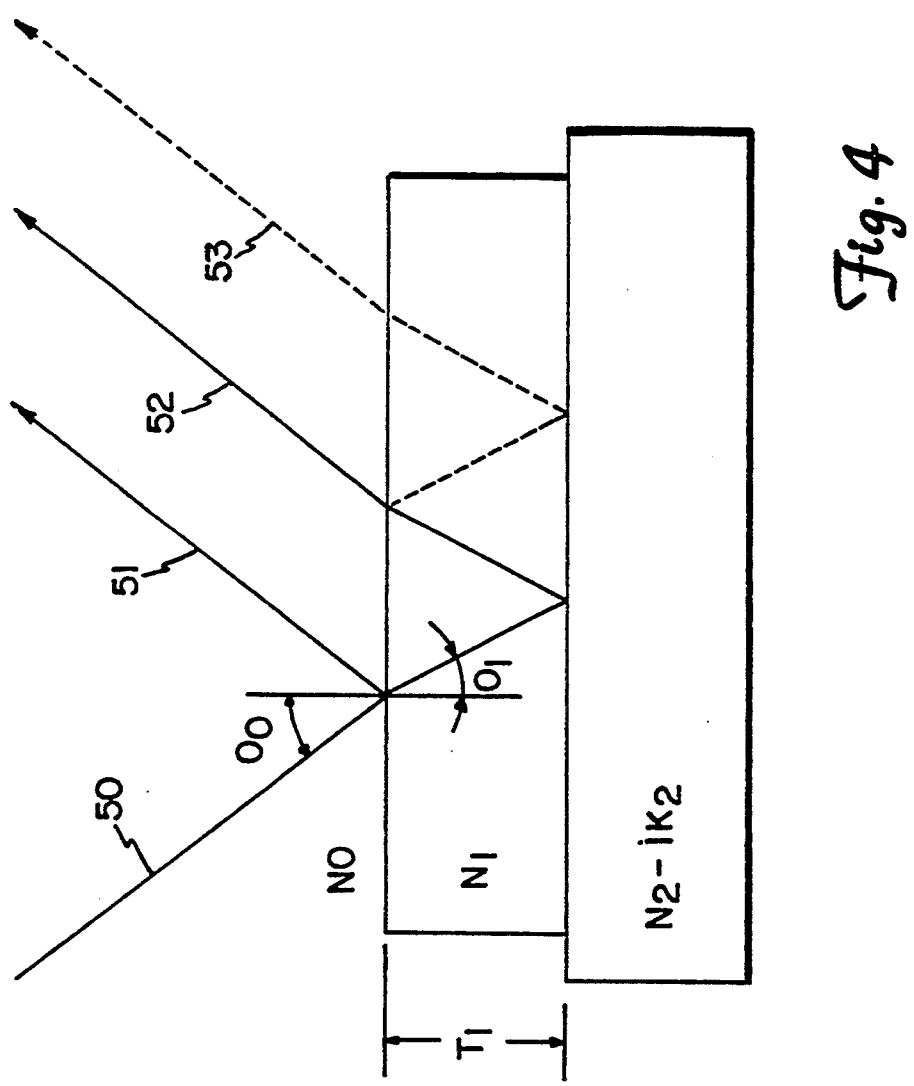
FIG. 4 is a cross-sectional illustration of the thickness of a dielectric coating over a reflective mirror surface and the angles of incidence and refraction at the air-dielectric coating interface and the dielectric coating-mirror surface interface of the multiple reflected components of the incident light beam, which give rise to phase shifts and amplitude variations with regard to each component.

As mentioned above, the optical coatings on the facets 21 of the polygon shaped rotating mirror 20 have typically been chosen in the past at the ½ wave length optical thickness defined by $L_0/2N$ for obtaining the highest average reflectance at normal incidence, or $L_0/2N \cos\Theta_1$ for obtaining the highest average reflectance at an angle of incidence $\Theta_0$ Ref. FIG. 4).

Figure 2:
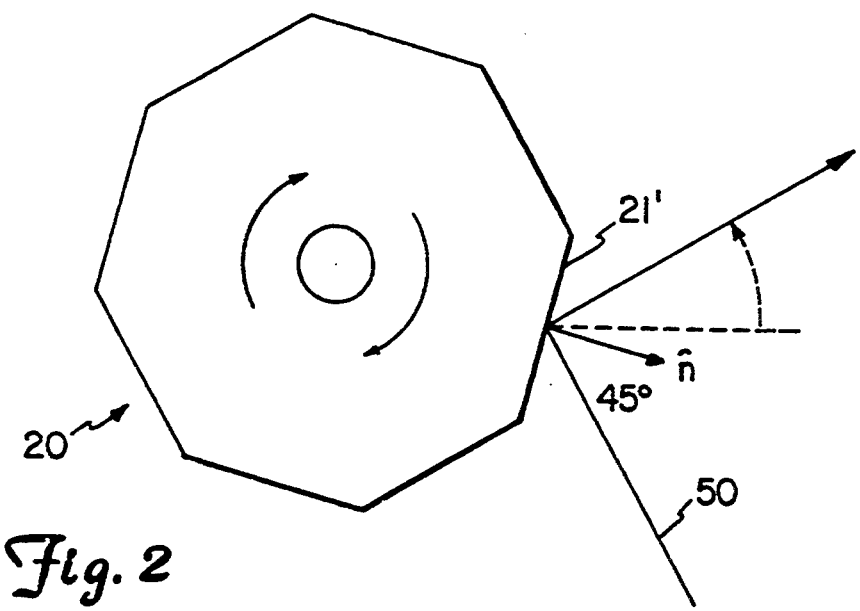
FIG. 2 is an illustration of the reflectance of an incident beam by a polygon-shaped mirror facet at the start of a scan.
Figure 3:
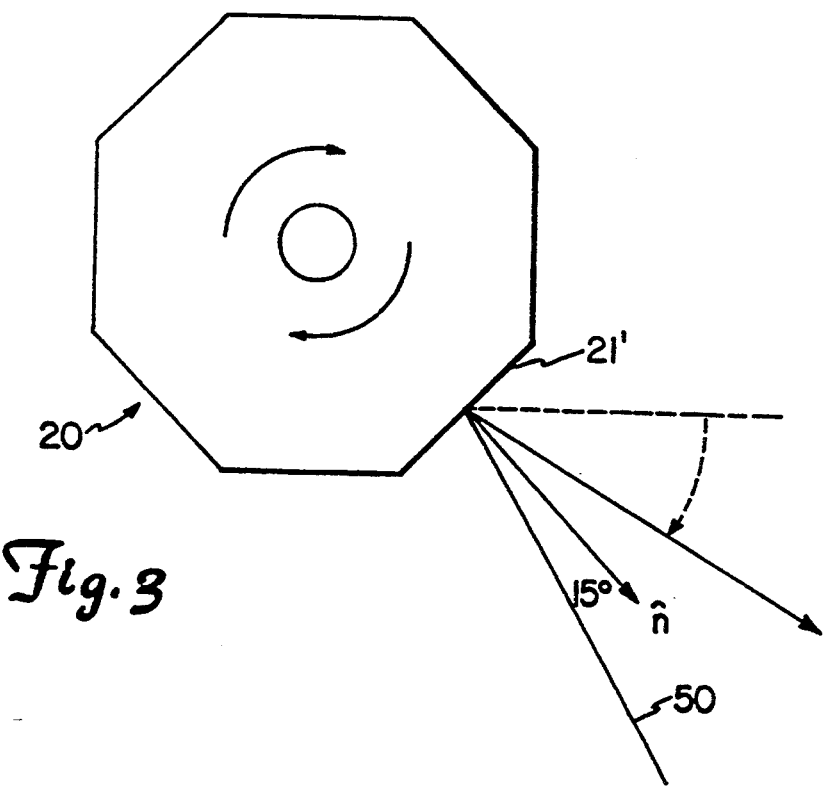
FIG. 3 is an illustration of the reflectance of an incident beam by a polygon-shaped mirror facet at the end of a scan.

Turning now to FIGS. 2 and 3, they illustrate the reflectance of the incident light beam 50 from a facet 21 at the start and end of a scanning line.

In FIG. 2, at the start of scan, the incident light beam 50 strikes the facet 21 at a 45° angle to its normal direction and is reflected at 45° from normal. In FIG. 3 the incident light beam 50 strikes the facet 21 at 15° to normal and is likewise reflected away at 15° from normal. Although not depicted in FIGS. 2 and 3, it will be understood that at midpoint in a scan, the incident light beam 50 strikes the facet 21 at 30° of normal and the dotted line projections in FIGS. 2 and 3 indicate the midpoint reflectance of 30° in the center of the planar array of the reflected light beam. The planar array is defined by the dotted-line arrows shown in FIGS. 2 and 3.

If the reflectance varies over the angular range of incident light, then the intensity of the scanning beam will likewise vary across the planar array, causing image density to suffer. Similarly, if the facet to facet reflectance varies, image quality will suffer on a line by line basis; however, this latter artifact is easily compensated for with electronics or software correction.

Turning now to FIG. 4, it depicts the reflectance of an incident light beam 50 from a mirror having a protective coating having a thickness $T_1$.

The reflected light beam is made up of three reflectance components 51, 52 and 53 which are reflected from the air-coating interface $N_0$-$N_1$, the coating-polished mirror surface interface $N_1$-$N_2$ and the reflectance of a portion of beam 52 back at the air-coating interface to the other interface, respectively.

Figure 5:
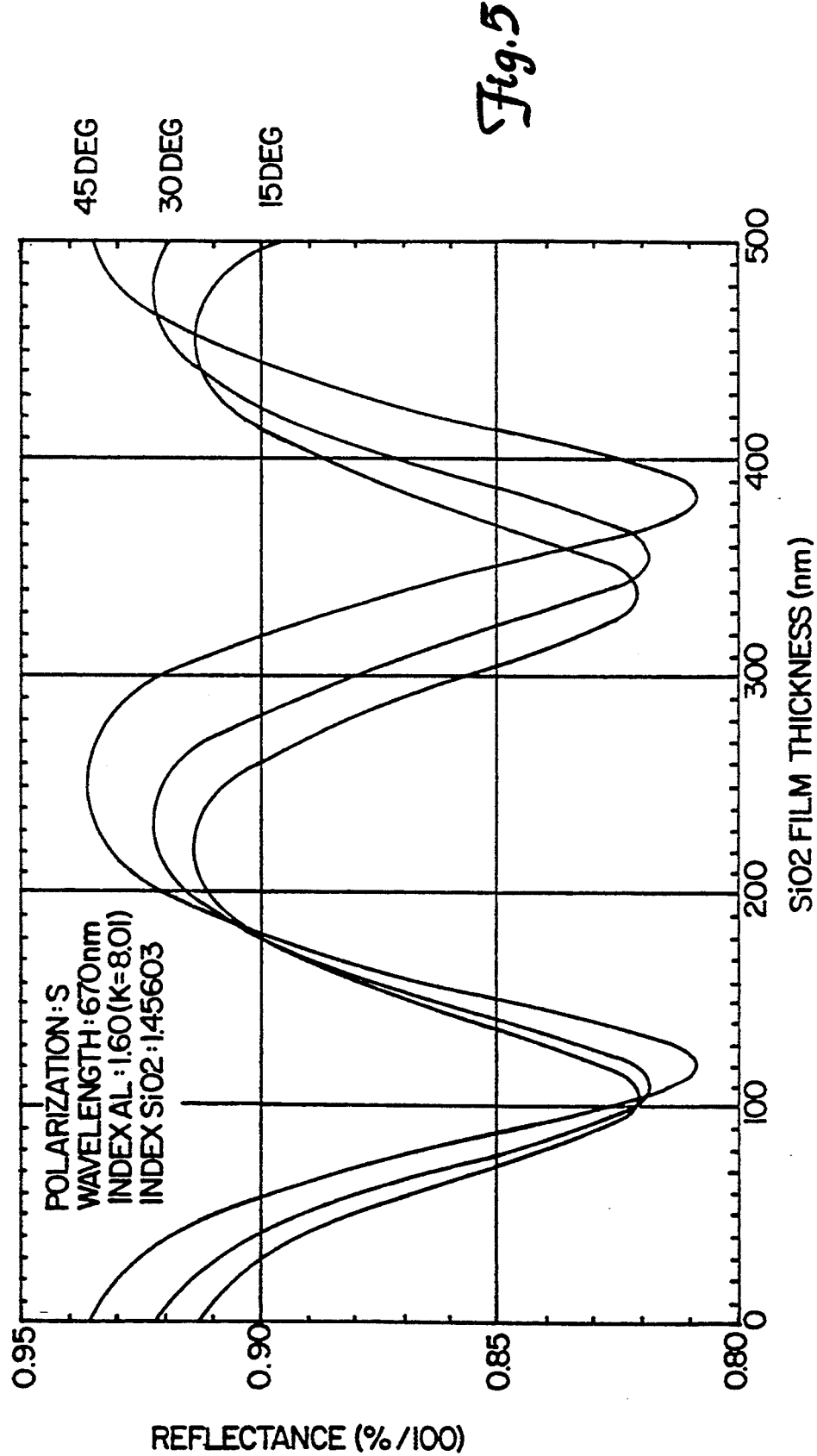
FIG. 5 is a plot of the reflectance of the coated mirror to incident light beams presented at the center and extreme scanning angles as a function of the dielectric coating thickness with S-polarization radiation at a predetermined wave length.
Figure 6:
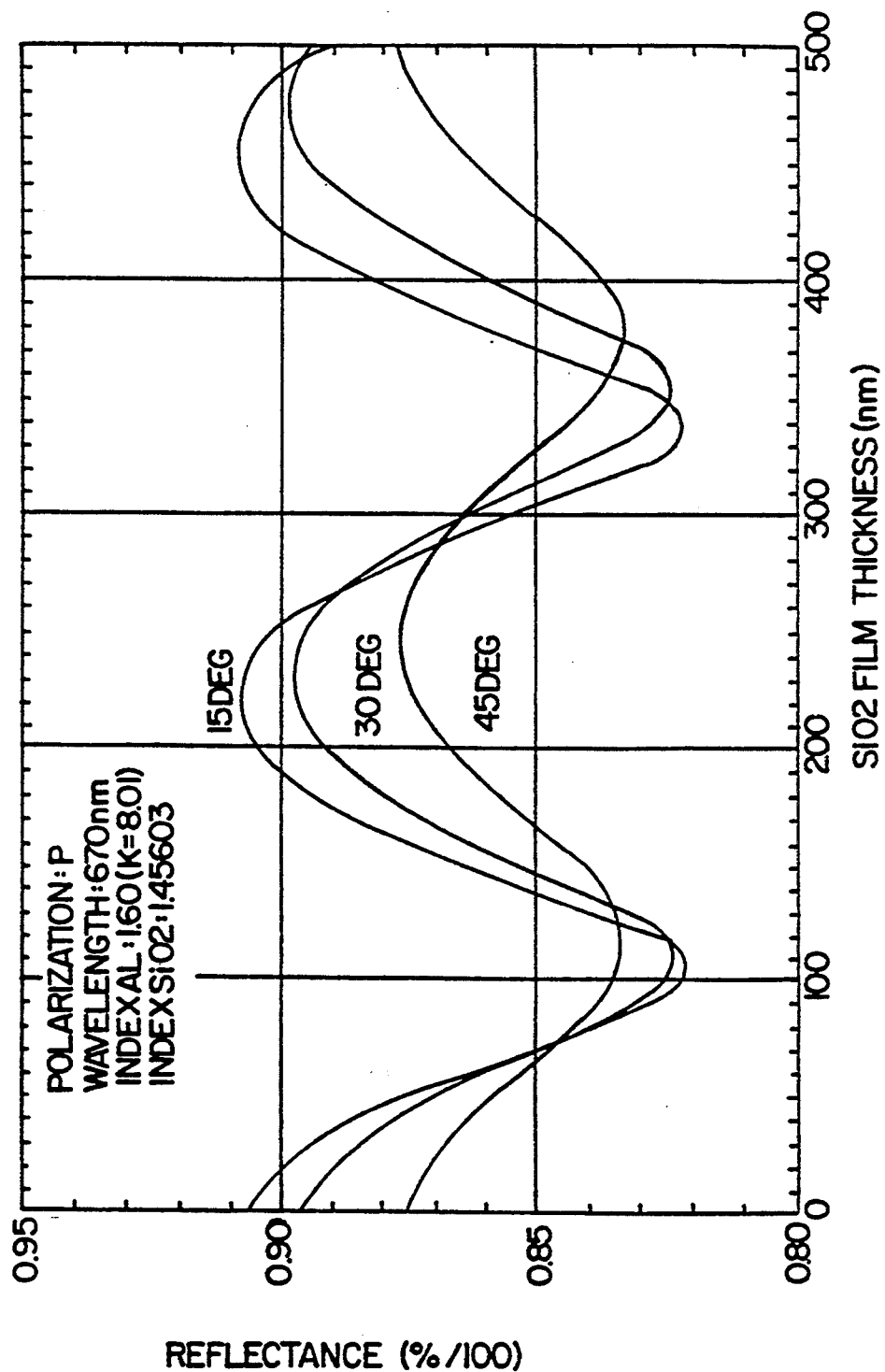
FIG. 6 is a plot of the reflectance of the coated mirror to incident light beams presented at the center and extreme scanning angles as a function of the dielectric coating thickness with P-polarization radiation at a predetermined wave length.

Turning now to FIGS. 5 and 6, they illustrate the reflectance of a polished aluminum mirror substrate with a $SiO_2$ protective coating at the 15°, 30° and 45° angles of incidence of the source light beam 50 through a range of potential protective layer thicknesses. FIG. 5 is a graphical depiction of the reflectance of S-polarization light beam at a wave length of 670 nanometers and FIG. 6 is a graphical depiction of the reflectance of P-polarization light at the same wave length. Both graphs show that the reflectance peaks at each of the angles in the 200–240 nm thickness which correlates well with the formula $L_0/2N \cos\Theta$, where $L_0$ equals 670 nm and N equals the index of refraction of the silicone dioxide layer, that is 1.45603.

In accordance with the present invention, it has been found that the reflectances of polarized incident light beams at 15°, 30° and 45° angles of incidence tend to converge or cross over at certain thicknesses $T_1$ of the protective layer, and that these regions of convergence indicate the optimal thickness to be employed to minimize reflectance variations in that range of incident light beam scanning angles.

For example, as shown in FIG. 5, with S-polarization incident light of a wave length of 670 nanometers, the optimal thickness $T_1$ of about 180 nanometers, achieves about a 90% reflectance at 15°, 30° and 45° angles of incidence. A second point of convergence of reflectances is indicated at about 100 nanometers thickness for this particular wave length and polarization.

By contrast, as shown in FIG. 6, with P-polarization incident light at a wave length of 670 nanometers, the optimal thickness $T_1$ would appear to be at about 70 nanometers, achieving about 85% reflectance at 15°, 30° and 45° angles of incidence.

Turning now to the derivations of the wave forms of reflectance intensity for the 15°, 30° and 45° incident light beams in the range of coating thicknesses up to 500 nanometers depicted in FIGS. 5 and 6, it will be understood that the reflectances are calculated using known algorithms for each incremental thickness as follows:
We begin with the following assumptions:
1) Incident radiation is spatially and temporally coherent;

2) Incident radiation is either S- or P-polarization;
3) Incident wavefront is not significantly distorted by the dielectric coating nor by the metallic substrate; and
4) Lateral displacements between the reflected components are not significant, i.e., displacements << beam dimensions.

Given a limiting angle of incidence, $\Theta_0$, as shown in FIG. 4, the angle of refraction, $\Theta_1$, is calculated by the equation:

$$\theta_1 = \arcsin\left(\frac{n_0}{n_1}\sin\theta_0\right)$$

This angle is also the angle of incidence upon the metallic substrate. Given the refractive indices of the surrounding environment, $n_0$, and that of the dielectric coating material, $n_1$, the reflectance of the environment/dielectric interface, $R_1$, for each polarization, is calculated by the equations:

$$R_{1S} = \left[\frac{n_1\cos\theta_1 - n_0\cos\theta_0}{n_1\cos\theta_1 + n_0\cos\theta_0}\right]^2$$

$$R_{1P} = \left[\frac{n_1\cos\theta_0 - n_0\cos\theta_1}{n_1\cos\theta_0 + n_0\cos\theta_1}\right]^2$$

Calculation of the reflectance for the dielectric/metallic interface, $R_2$, is much more involved. Derivation of these equations is detailed in the text *Principles of Optics*, by Max Born and Emil Wolf. Given the complex refractive index ($n+ik$) of the metallic substrate, $n_2$ and $k_2$, the latter parameter being known as the extinction coefficient, the reflectance of this interface, for each polarization, is calculated by the following equations:

$$\kappa_2 = k_2/n_2$$

$$u = \sqrt{0.5 \times (n_2^2(1-\kappa_2^2) - n_1^2\sin^2\theta_1 + \sqrt{[n_2^2(1-\kappa_2^2) - n_1^2\sin^2\theta_1]^2 + 4n_2^4\kappa_2^2})}$$

$$v = \sqrt{0.5 \times (-[n_2^2(1-\kappa_2^2) - n_1^2\sin^2\theta_1] + \sqrt{[n_2^2(1-\kappa_2^2) - n_1^2\sin^2\theta_1]^2 + 4n_2^4\kappa_2^2})}$$

$$R_{2S} = \frac{(n_1\cos\theta_1 - u)^2 + v^2}{(n_1\cos\theta_1 + u)^2 + v^2}$$

$$R_{2P} = \frac{[n_2^2(1-\kappa_2^2)\cos\theta_1 - n_1u]^2 + [2n_2^2\kappa_2\cos\theta_1 - n_1v]^2}{[n_2^2(1-\kappa_2^2)\cos\theta_1 + n_1u]^2 + [2n_2^2\kappa_2\cos\theta_1 + n_1v]^2}$$

There also occurs a phase change, $\Phi_2$, associated with reflectance from the dielectric/metallic interface. This phase change, for each polarization, is calculated as follows:

$$\Phi_{2S} = \arctan\left[\frac{2vn_1\cos\theta_1}{u^2 + v^2 - n_1^2\cos^2\theta_1}\right]$$

$$\Phi_{2P} = \arctan\left[2n_1n_2^2\cos\theta_1 \frac{2\kappa_2 u - (1-\kappa_2^2)v}{n_2^4(1-\kappa_2^2)^2\cos\theta_1 - n_1^2(u^2+v^2)}\right]$$

In addition to the phase change on reflection, the portion of the energy which reflects from the dielectric/metallic interface will be shifted in phase, relative to that portion which reflects from the environment/dielectric interface, by an amount, $2\beta$. Given the thickness of dielectric layer, $T_1$, and the wavelength of the incident energy, $\lambda$, this phase shift, which is independent of the state of the incident polarization, can be calculated by:

$$2\beta = \frac{2\pi}{\lambda} 2n_1 T\cos\theta_1$$

Having determined the intensity of the reflected components, and the phase relationship between them, coherent addition of the multiply reflected components will define the actual reflectance of the mirror and its phase shift for a specific angle of incidence. These parameters may be calculated, for each polarization, by the equations which result from the coherent addition of the multiple reflected components:

$$R_S = \frac{R_{1S} + R_{2S} + 2\sqrt{R_{1S}R_{2S}}\cos(2\beta + \Phi_{2S})}{1 + R_{1S}R_{2S} + 2\sqrt{R_{1S}R_{2S}}\cos(2\beta + \Phi_{2S})}$$

$$\Phi_S = \arctan\left[\frac{\sqrt{R_{2S}}(1 - R_{1S})\sin(2\beta + \Phi_{2S})}{\sqrt{R_{1S}}(1 + R_{2S}) + \sqrt{R_{2S}}(1 + R_{1S})\cos(2\beta + \Phi_{2S})}\right]$$

$$R_P = \frac{R_{1P} + R_{2P} + 2\sqrt{R_{1P}R_{2P}}\cos(2\beta + \Phi_{2P})}{1 + R_{1P}R_{2P} + 2\sqrt{R_{1P}R_{2P}}\cos(2\beta + \Phi_{2P})}$$

$$\Phi_P = \arctan\left[\frac{\sqrt{R_{2P}}(1 - R_{1P})\sin(2\beta + \Phi_{2P})}{\sqrt{R_{1P}}(1 + R_{2P}) + \sqrt{R_{2P}}(1 + R_{1P})\cos(2\beta + \Phi_{2P})}\right]$$

To numerically obtain the dielectric coating thickness, $T_1$, which minimizes reflectance variation with angle of incidence, this procedure should be incrementally repeated over a range of dielectric coating thicknesses, for each of the two limiting angles of incidence, $\Theta_0$. The smallest or second smallest coating thickness, for which the two reflectances are equal, gives the optimal solutions as described above.

In order to obtain an algebraic solution, one must equate one of the latter reflectance equations ($R_s$ or $R_p$), with itself-each possessing a different limiting angle of incidence and then solve for the variable $T_1$. The numerical calculations, at the solution thicknesses, for FIGS. 5 and 6, are as follows:

| For S-Polarization (FIG. 5): | | | |
|---|---|---|---|
| $n_0$ | 1.000 | | |
| $n_1$ | 1.456 | | |
| $n_2$ | 1.600 | | |
| $k_2$ | 8.010 | | |
| $T_1$ | 103.50 nm | $T_1$ | 103.50 nm |
| $\theta_0$ | 15.00 deg | $\theta_0$ | 45.00 deg |
| $\theta_1$ | 10.24 deg | $\theta_1$ | 29.06 deg |
| $R_{1S}$ | 3.79% | $R_{1S}$ | 8.16% |
| $R_{1P}$ | 3.12% | $R_{1P}$ | 0.67% |
| $R_{2S}$ | 87.52% | $R_{2S}$ | 88.86% |
| $R_{2P}$ | 87.13% | $R_{2P}$ | 85.62% |
| $\Phi_{2S}$ | 19.53 deg | $\Phi_{2S}$ | 17.34 deg |
| $\Phi_{2P}$ | 20.18 deg | $\Phi_{2P}$ | 22.72 deg |
| $2\beta$ | 159.36 deg | $2\beta$ | 141.56 deg |
| $>R_S$ | 82.05% | $R_S$ | 82.05% |
| $R_P$ | 82.11% | $R_P$ | 83.39% |
| $\Phi_S$ | −1.64 deg | $\Phi_S$ | −37.13 deg |
| $\Phi_P$ | −0.66 deg | $\Phi_P$ | −18.48 deg |
| $\Phi_S-\Phi_P$ | −0.98 deg | $\Phi_S-\Phi_P$ | −18.65 deg |

| For P Polarization (FIG. 6): | | | |
|---|---|---|---|
| $n_0$ | 1.000 | | |
| $n_1$ | 1.456 | | |
| $n_2$ | 1.600 | | |
| $k_2$ | 8.010 | | |
| $T_1$ | 72.25 nm | $T_1$ | 72.25 nm |
| $\theta_0$ | 15.00 deg | $\theta_0$ | 45.00 deg |
| $\theta_1$ | 10.24 deg | $\theta_1$ | 29.06 deg |
| $R_{1S}$ | 3.79% | $R_{1S}$ | 8.16% |
| $R_{1P}$ | 3.12% | $R_{1P}$ | 0.67% |
| $R_{2S}$ | 87.52% | $R_{2S}$ | 88.86% |
| $R_{2P}$ | 87.13% | $R_{2P}$ | 85.62% |
| $\Phi_{2S}$ | 19.53 deg | $\Phi_{2S}$ | 17.34 deg |
| $\Phi_{2P}$ | 20.18 deg | $\Phi_{2P}$ | 22.72 deg |
| $2\beta$ | 159.36 deg | $2\beta$ | 98.82 deg |
| $R_S$ | 84.90% | $R_S$ | 87.75% |
| $>R_P$ | 84.58% | $R_P$ | 84.58% |
| $\Phi_S$ | −68.45 deg | $\Phi_S$ | 83.38 deg |
| $\Phi_P$ | −65.69 deg | $\Phi_P$ | −66.80 deg |
| $\Phi_S-\Phi_P$ | −2.75 deg | $\Phi_S-\Phi_P$ | 150.19 deg |

Note that $\Phi_S-\Phi_P$, the relative phase shift between S- and P- polarization components is not small. The relative phase shift is not insensitive to angle of incidence as is the case for coatings of the type given in U.S. Patent No. 4,662,722; however, the reflectance is insensitive to the angle of incidence, for a particular polarization. The sinusoidal waveshapes of reflectances at 15°, 30° and 45° for S- and P- polarization, 670 nm wavelength incident radiation depicted in FIGS. 5 and 6 are thus generated by repetitive solution of the above equations for each incremental thickness value.

Although only a single currently preferred best mode of practicing the invention employing the specified mirror substrate and protective coating materials in conjunction with S- and P-polarization incident radiation at 670 nm wavelength has been described in detail, it will be appreciated that the invention may be practiced employing a wide variety of mirror and dielectric coating materials, including metal oxides, fluorides, sulfides of silicon, aluminum, magnesium, tantalum, titanium, etc. Such materials are set forth in the above-referenced patents, for example. Many other wavelengths, e.g., 830 nm, 633 nm, and others conveniently available with conventional laser sources may be employed in the practice of the invention.

The invention has been described in detail with particular reference to preferred embodiments thereof, but it will be understood that variations and modifications can be effected within the spirit and scope of the invention.

What is claimed is:

1. A mirror for optically scanning an incident light beam consisting of P-polarized light having a single plane of polarization and a single wavelength presented in a range of varying angles of incidence thereto defining a scanning plane oriented at 0° to the single plane of polarization of the polarized light beam through a corresponding range of reflected light beam scanning angles comprising a reflective mirror surface coated with a protective layer of a dielectric coating to protect the mirror surface from oxidation while being substantially transmissive to the incident polarized light beam, wherein said coating is selected to have an optical thickness selected in relation to the 0° orientation of the plane of polarization and the half wave optical thickness corresponding to the wavelength of the polarized light, such that the selected optical thickness differs from the half wave optical thickness sufficiently to provide a minimum variation in the magnitude of reflectance of the incident light beam over the range of varying angles of incidence.

2. An optical scanner for scanning a light beam onto a source image to read information therefrom or onto a receiving medium for recording image information thereon of the type comprising:
   a light beam source consisting of P-polarized single wavelength light;
   deflector means for scanning the polarized light beam incident thereon through a predetermined scanning angle thereby establishing a varying angle of incidence of the polarized light beam thereon, said deflector means being oriented with respect to said light beam source so that the P-polarized light is horizontal respectively, to the plane of said predetermined scanning angle; and
   optical means interposed between said deflector means and said source image or receiving medium for directing said polarized light beam scanned through said predetermined scanning angle onto said source image or receiving medium, wherein said deflector means further comprises:
   a reflective mirror having a predetermined width in the plane of said predetermined scanning angle, said reflective mirror coated with a protective coating for preventing degradation of said mirror's reflectivity, said protective coating having an optical thickness selected in relation to the single wavelength of the P-polarized light, such that the selected optical thickness differs from the half wave optical thickness sufficiently to provide minimal variation in the magnitude of the reflectance of the polarized incident light beam by said coated mirror throughout the varying angle of incidence of the polarized light beam onto said coated reflective mirror during deflection of said coated reflective mirror; and
   means for periodically deflecting said coated reflective mirror to vary the angle of incidence of the polarized light beam thereon and scan the reflected polarized light beam through said predetermined scanning angle.

* * * * *

UNITED STATES PATENT AND TRADEMARK OFFICE
CERTIFICATE OF CORRECTION

PATENT NO. : 5,438,446
DATED : August 1, 1995
INVENTOR(S) : M.B. Brandt

It is certified that error appears in the above-indentified patent and that said Letters Patent is hereby corrected as shown below:

Col. 7, line 67

The "$\cos\theta_1$" in the denominator should be --$\cos^2\theta_1$--.

Signed and Sealed this

Thirty-first Day of October 1995

Attest:

BRUCE LEHMAN

Attesting Officer    Commissioner of Patents and Trademarks